W. N. MATHEWS.
REGENERATIVE GLASS FURNACE.
APPLICATION FILED DEC. 3, 1918.

1,324,918.

Patented Dec. 16, 1919.
3 SHEETS—SHEET 1.

INVENTOR
W. N. Mathews.
BY
N. E. Dunlap
ATTORNEY

W. N. MATHEWS.
REGENERATIVE GLASS FURNACE.
APPLICATION FILED DEC. 3, 1918.

1,324,918.

Patented Dec. 16, 1919.
3 SHEETS—SHEET 3.

INVENTOR
W. N. Mathews
BY N. E. Dunlap
ATTORNEY

UNITED STATES PATENT OFFICE.

WILLIAM N. MATHEWS, OF WELLSBURG, WEST VIRGINIA.

REGENERATIVE GLASS-FURNACE.

1,324,918.　　　　　　Specification of Letters Patent.　　Patented Dec. 16, 1919.

Application filed December 3, 1918. Serial No. 265,116.

*To all whom it may concern:*

Be it known that I, WILLIAM N. MATHEWS, a citizen of the United States of America, and resident of Wellsburg, county of Brooke, and State of West Virginia, have invented certain new and useful Improvements in Regenerative Glass-Furnaces, of which the following is a specification.

This invention relates broadly to glass furnaces, and more specifically to a regenerative furnace.

The primary object of the invention is to provide a regenerator glass furnace which embodies in its refining and cooling end muffle arches whereby the glass is shielded from the burning gases and is, consequently, rendered free from the contamination and discoloration which results from direct contact of such gases therewith, and, further, is maintained in a quiescent state due to the introduction through said muffle arches of a soaking heat as distinguished from the intense burning heat which obtains in the refining chambers of furnaces as heretofore constructed.

Subjected to the intense direct heat of the gases in a refining and cooling chamber of the open character heretofore commonly employed, the glass is not only discolored by contact with the products of combustion and contaminated by particles of carbon and other impurities carried by the gases or resulting from combustion, but it is more or less violently agitated by the burning heat absorbed thereby, which causes foreign particles to be carried to the surface in the form of cords or seeds, resulting ultimately in excessive wastage and an inferior product.

As hereinbefore indicated, it is a purpose of this invention to obviate the objections just recited by the provision of muffle arches in the refining and cooling chambers.

A further object is to provide, in a furnace of the character mentioned means whereby the heat may be regulated to gradually cool the glass, bringing the same to a proper working condition at the working end of the refining chamber.

With these and other objects in view, the invention resides in the features of construction, arrangement of parts and combinations of elements which will hereinafter be fully described, reference being had to the accompanying drawings, in which—

Referring to said drawings, in which like designating characters distinguish like parts throughout the several views—

Figure 1:
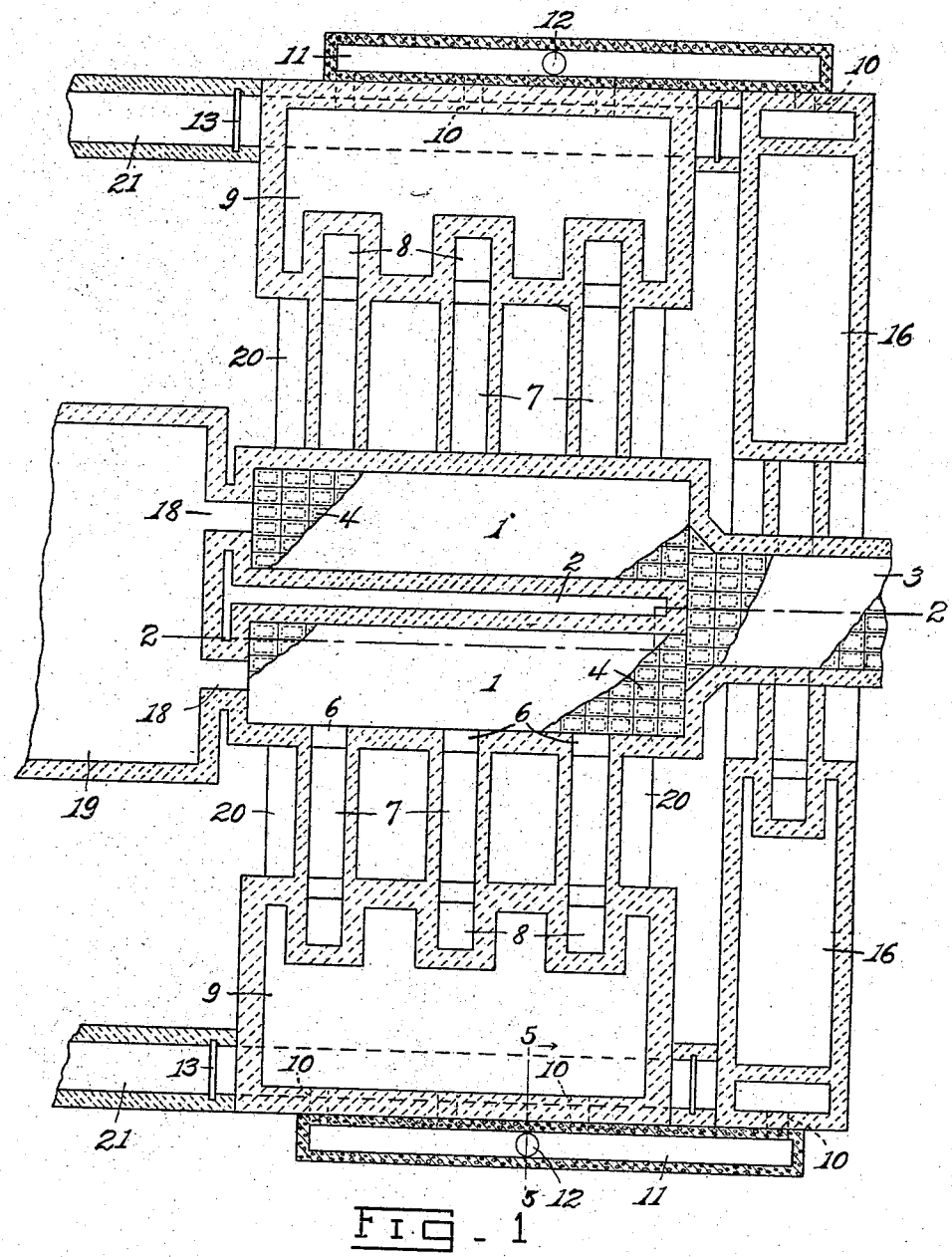
Figure 1 is a generally horizontal section of the refining, cooling and regeneration chambers of a regenerative furnace.
Figure 2:
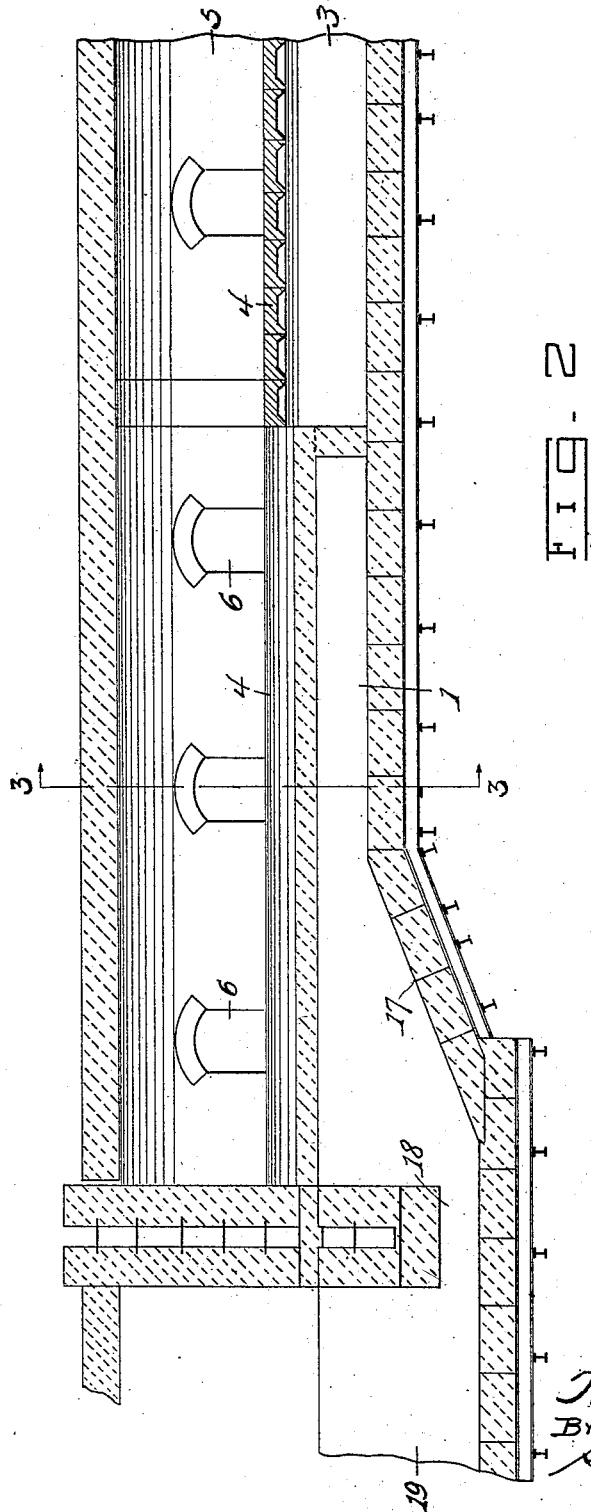
Fig. 2 is an enlarged longitudinal section taken substantially on line 2—2, Fig. 1.
Figure 3:
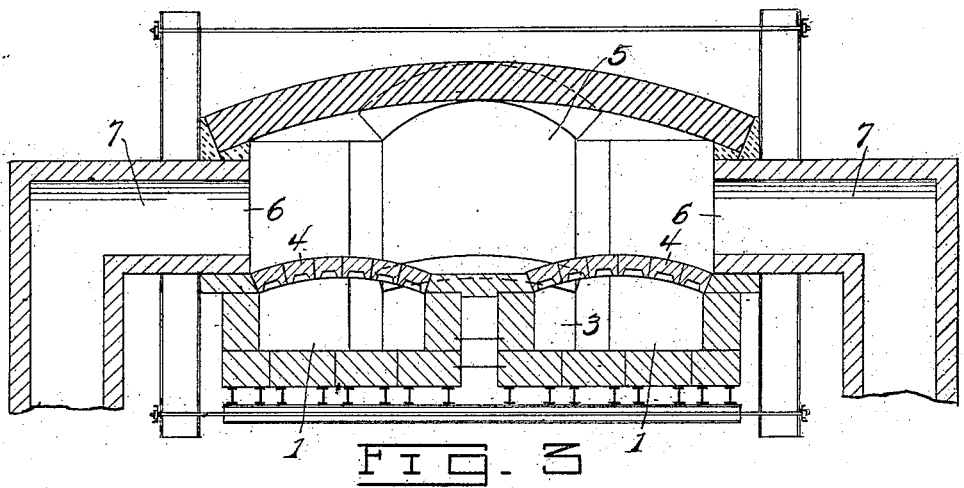
Fig. 3 is a transverse section taken approximately on line 3—3, Fig. 2.
Figure 4:
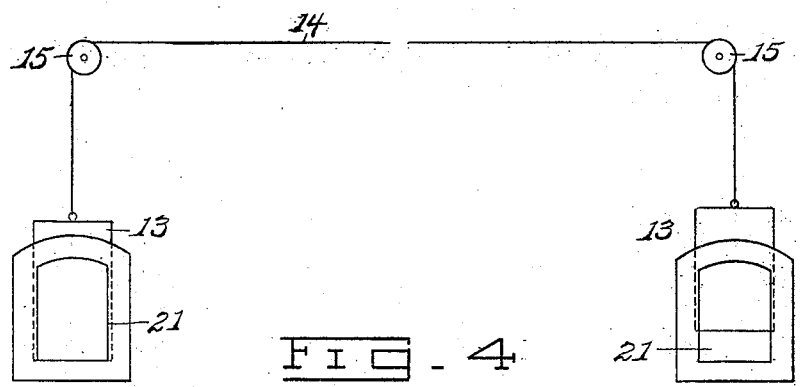
Fig. 4 is a diagram illustrative of the companion damper arrangement employed in the regenerator flues; and—
Figure 5:
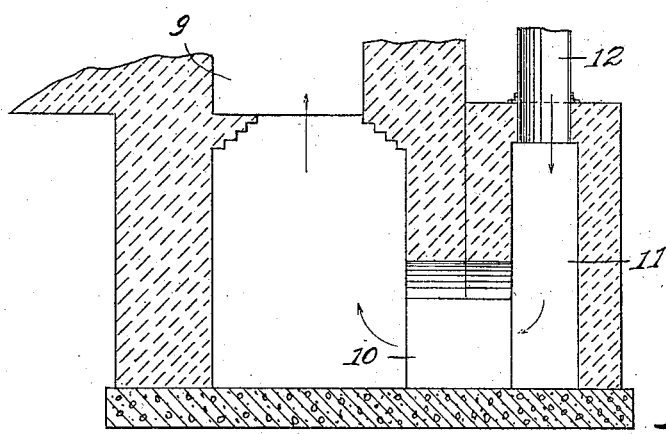
Fig. 5 is a section on line 5—5, Fig. 1.

1 indicates two opposite sides of a refining chamber, said sides being separated by an air space 2 and merging at their forward ends into a single longitudinally disposed cooling chamber 3 which extends forward to the working point (not shown). Located over said refining chambers 1 and the cooling chamber 3 and separated therefrom by muffle arches 4 composed of refractory blocks or tiles in the combustion chamber 5. Gas is introduced in said combustion chamber at separated points or spaced intervals throughout its length through ports 6 to which the gas is conducted through passages 7 leading from a regenerator heating chamber or chambers 20 of common checkered form located laterally with respect to said combustion chamber. Air for supporting combustion also enters the combustion chamber with the gas so as to be thoroughly commingled or mixed with the latter, such air being conducted upward to the various passages 7 through passes 8 leading from regenerator air chambers 9.

As is obvious, the arrangement of the regenerator heating chambers 20 and 9 with their passages and ports at opposite sides of the combustion chamber provides for their alternate employment as inlet passages for gas and air and as outlet passages for waste gases according to the regenerative principle. Control of the direction of travel is had through suitable oppositely arranged dampers, as 13, suspended in flues 21 at opposite ends of a cable 14 which is disposed across the top of the furnace and which operates upon sheaves or pulleys 15, one of said dampers being in elevated flue-opening position when the other occupies its lowered flue-closing position.

Located in front of the regenerator heating chamber 9 at each side of the furnace is a regenerator chamber 16 associated with the cooling end of the combustion chamber 5 of the furnace, the same being designed to introduce gas and air over the muffle arch in said cooling end in precisely the same manner as over the arches of the refining chambers hereinbefore referred to.

Located laterally with respect to the regenerator chambers 9 and 16 at opposite sides of the furnace and communicating with said chambers through ports or flues 10 located at intervals at or near the bottoms of the outer side walls of the latter are auxiliary air chambers 11 to which air is conducted through a pipe or pipes 12 leading from a suitably located fan or blower (not shown), or air at atmospheric pressure may be supplied therethrough.

The bottoms or floors of the refining chambers are upwardly and forwardly inclined, as shown at 17, at the end thereof adjacent to the throats 18 through which the glass flows to said chamber from the melting chamber 19. This renders the forward ends of said refining chambers and the cooling chamber of relatively less depth so that the glass in said chambers will be heated throughout to a substantially uniform temperature.

What is claimed is—

1. In a regenerative glass furnace, a pair of refining chambers disposed side by side and suitably separated, a cooling chamber located forward of said refining chambers and having the latter communicating therewith at their front ends, a combustion chamber located over said refining and cooling chambers, and muffle arches overlying said refining chambers and the cooling chamber and separating the same from said combustion chamber.

2. In a regenerative glass furnace, the combination with a melting chamber, of separated refining chambers to which glass flows from said melting chamber, said refining chambers having their bottoms located at a higher level than that of said melting chamber, a combustion chamber located over said refining chambers, and muffle arches overlying said refining chambers and separating the same from said combustion chamber.

3. In a regenerative glass furnace, the combination with a melting chamber, of separated refining chambers to which glass flows from said melting chamber, said refining chambers having their bottoms located at a higher level than that of said melting chamber, a cooling chamber located forward of said refining chambers and in open communication with the latter, muffle arches overlying said refining chambers and said cooling chamber, and a combustion chamber located over said muffle arches.

4. In a regenerative glass furnace, the combination with a melting chamber, of a plurality of refining chambers arranged side by side and separated by intermediate air spaces, throats through which glass flows from said melting chamber to said refining chambers, a cooling chamber located forward of said refining chambers and in open communication with the front ends of the latter, a combustion chamber located over said refining chambers and said cooling chamber, and muffle arches separating the last-mentioned chambers from said combustion chamber.

5. In a regenerative glass furnace, the combination with a melting chamber, of a plurality of refining chambers arranged side by side and separated by intermediate air spaces, throats through which glass flows from said melting chamber to said refining chambers, the floors of said refining chambers being located on a level above that of said throats, a cooling chamber located forward of said refining chambers and in open communication with the front ends of the latter, a combustion chamber located over said refining chambers and said cooling chamber, and muffle arches separating the last-mentioned chambers from said combustion chamber.

6. In a regenerative glass furnace, a plurality of separated refining chambers, a cooling chamber located forward of said refining chamber and in open communication with the front ends of the latter, a combustion chamber located over said chambers, muffle arches located over and separating said refining and cooling chambers from said combustion chambers, means including a damper controlled regenerator supplying air to said combustion chamber, and auxiliary means for supplying air to said combustion chamber through said regenerators.

In testimony whereof, I affix my signature in presence of two subscribing witnesses.

WILLIAM N. MATHEWS.

Witnesses:
 H. E. DUNLAP,
 R. W. MILLER.